Patented Feb. 19, 1924.

1,484,370

UNITED STATES PATENT OFFICE.

FRANCIS A. BARTLETT, OF STAMFORD, CONNECTICUT.

COMPOSITION SUBSTITUTE FOR WOOD, TILE, OR OTHER BUILDING MATERIAL.

No Drawing. Application filed October 16, 1920. Serial No. 417,358.

*To all whom it may concern:*

Be it known that I, FRANCIS A. BARTLETT, a citizen of the United States, and a resident of Stamford, in the county of Fairfield and State of Connecticut, have invented a new and Improved Composition Substitute for Wood, Tile, or Other Building Material, of which the following is a full, clear, and exact description.

This invention relates to an improved composition of matter, an object of the invention being to provide a composition which is of practical use as a wood substitute, such, for example, as a material for making furniture, building material, parts of vehicles, steering wheels, flooring, and for many other analogous uses where wood has ordinarily been employed.

A further object is to provide a composition which can be so finished, surfaced and colored that it may be employed as an imitation tile.

The composition consists essentially of a filler or base of fibrous material, such, for example, as sawdust, wood flour, paper, or any other analogous material, and I use the term "fibrous material" in its broadest sense to cover any material adapted for the use.

With this fibrous material I mix a soluble silicate, such as silicate of soda, as a binder and so far as I have any knowledge, I am the first to use silicate of soda as a binder for fibrous material to form a composition which becomes hard and which can be used for many purposes as above indicated.

In accordance with the result in composition desired I may add to the mixture of the fibrous material and the silicate of soda, asbestos, cement, coloring materials, pigments, reenforcing material, such as wire, hemp, cord, iron rods, and strips of wood, and in fact, may use this composition with a multitude of various variations in accordance with the results desired, but in all cases the essential part of the composition will be a fibrous base mixed with silicate of soda. The silicate of soda used in the mixture is preferably of the consistency of molasses and is mixed cold with the fibrous material. "Silicate of soda" or "water-glass" are terms commonly applied to a commercial solution of sodium silicate of this character.

When the composition consists merely of the fibrous material and the silicate of soda, I use merely enough silicate of soda to thoroughly saturate the fibrous material which forms a composition at first pliable and plastic and which gradually hardens so that in the course of time it becomes extremely hard and durable. As a matter of fact, the composition hardens rather quickly so that there is no loss of time in the utilizing thereof, but its first form is plastic so that it can be readily shaped and molded, pressed, or otherwise given the contour desired, in accordance with the use to which it is to be put.

It is, of course, difficult to state the proportions of the composition which consist merely of fibrous material and silicate of soda, the latter in sufficient quantity to thoroughly saturate the mixture, and hence, I give below a composition in which other ingredients are included, which forms a mixture of great strength and durability.

Sawdust, 100 lbs.
Asbestos, from 5 to 25 lbs.
Cement, from 10 to 30 lbs.
Silicate of soda sufficient to saturate the other ingredients after the latter are thoroughly mixed and in a cold state.

To render the composition fireproof the asbestos is added and to cause it to become extermely hard, the cement is added and either or both of these ingredients may be omitted or used as found desirable.

While I have set forth the composition for known uses, it is obvious that ingredients may be added or left out in acordance with the use to which the material is to be put, and I do not wish to be limited to any particular combination of materials, but consider myself at liberty to use silicate of soda in combination with any fibrous material and other ingredients to form a commercial product.

I claim:

The herein described composition-substitute for structural material comprising sawdust about 100 parts, asbestos about 5 to 25 parts, cement about 10 to 30 parts, all the parts being by weight, together with sufficient soluble silicate binder to form a strong coherent mass.

FRANCIS A. BARTLETT.